Oct. 25, 1932. — L. RANNEY — 1,884,859
METHOD OF AND APPARATUS FOR INSTALLING MINE WELLS
Filed Feb. 12, 1930 — 2 Sheets-Sheet 1

INVENTOR
Leo Ranney
BY
W. E. Currie
ATTORNEY

Patented Oct. 25, 1932

1,884,859

UNITED STATES PATENT OFFICE

LEO RANNEY, OF NEW YORK, N. Y., ASSIGNOR TO STANDARD OIL DEVELOPMENT COMPANY, A CORPORATION OF DELAWARE

METHOD OF AND APPARATUS FOR INSTALLING MINE WELLS

Application filed February 12, 1930. Serial No. 427,743.

This invention relates to an improved method of and apparatus for recovery of fluid products, such as oil and gas from earth strata. The invention is particularly adapted for use in tapping oil-bearing and gas-bearing sands from a mine gallery adjacent thereto, and has for an object to recover the gas and oil without contamination by fluids contained in offending strata, intermediate the gallery and the oil-bearing sands. Other objects will be apparent from the specification and from the accompanying drawings in which.

Figure 1:
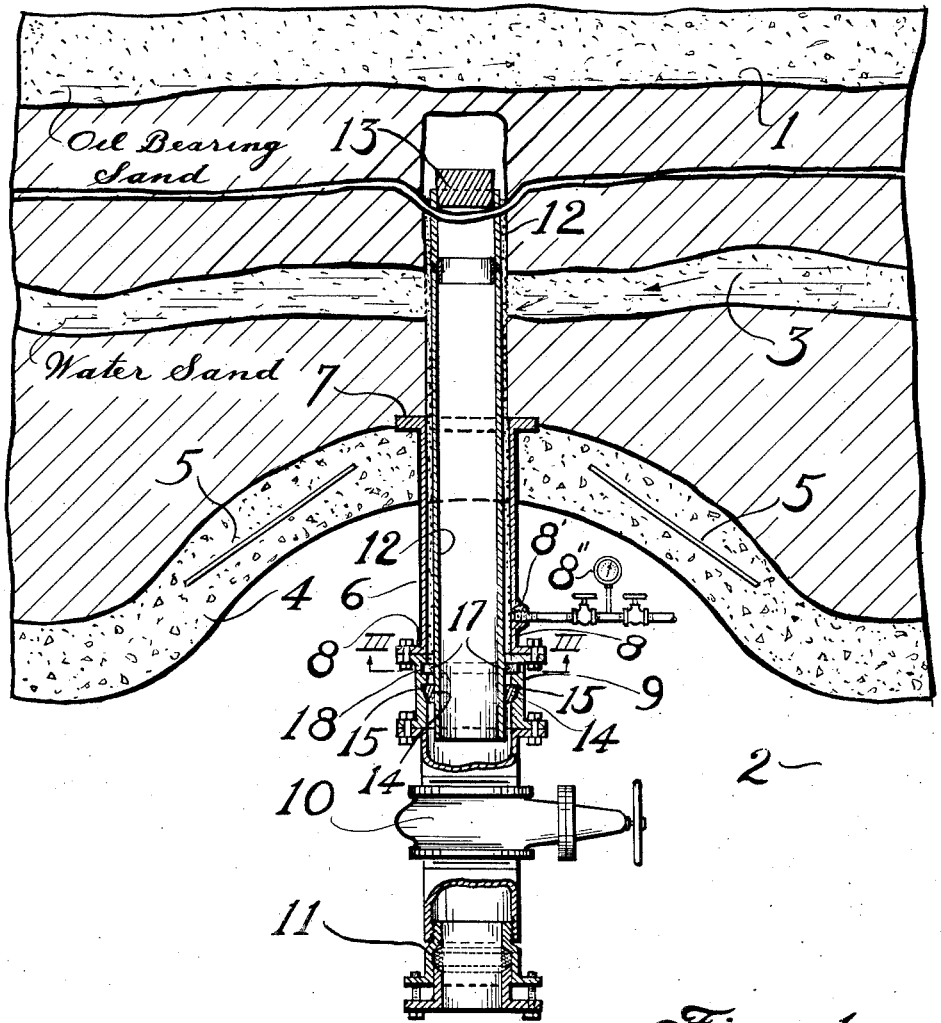
Fig. 1 is a longitudinal sectional view illustrating one embodiment of apparatus for carrying out the invention.

Referring particularly to the drawings, the invention is illustrated as applied to the tapping of an oil-bearing stratum 1 from a mine gallery 2 through a stratum 3 of water sand, gas sand, thin oil sand or other offending stratum. The offending stratum may be under pressure. In the preferred embodiment the portion of the gallery through which the oil-bearing stratum is to be tapped, is curved outwardly, and is reinforced with concrete 4 or the like. The concrete in turn, is preferably reinforced by means of reinforcing rods or boiler plate 5. A pipe 6 is sealed in an opening formed in the concrete, the pipe having a flange 7 bearing upon the exterior surface of the concrete and a flanged portion 8 projecting into the gallery. A valved conduit 8' communicates with the interior of the pipe 6 and is provided with a pressure gauge 8".

A sealing clamp 9 is affixed to the pipe and in turn carries a gate valve 10 and a stuffing box 11. A hole is formed from the pipe 6 through the offending stratum and is lined with a conduit 12. A closure 13 of wood, metal or other material is provided in the end of the conduit 12 and is capable of withstanding pressure from the outside of the conduit.

Figure 3:
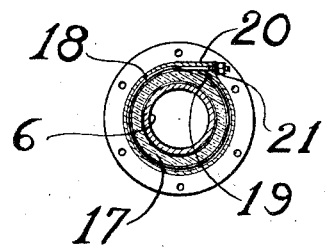
Fig. 3 is a transverse sectional view taken along the line III—III of Fig. 1.

The conduit is held in position in the pipe 6 by means of the sealing clamp 9 which comprises a body portion carrying slips 14 adapted to grip the conduit. The slips are caused to grip the conduit by the band 15. The sealing clamp comprises a body portion having an annular recess upon the inner surface thereof in which is disposed a gasket 17 of rubber or the like. The gasket is adapted to be compressed firmly against the conduit and the walls of the recess by means of a spring 18, see Fig. 3. The spring extends around the periphery of the gasket. Alternatively it may be embedded in the gasket. One end of the spring is secured to the wall of the recess at 19, and the other end has a substantially cylindrical shape and projects through a boss 20 formed on the body portion of the clamp. A nut 21 is threaded upon the cylindrical end of the spring and is adapted to be turned to tighten or loosen the engagement of the gasket with the conduit, and with the upper and lower walls of the recess.

Figure 2:
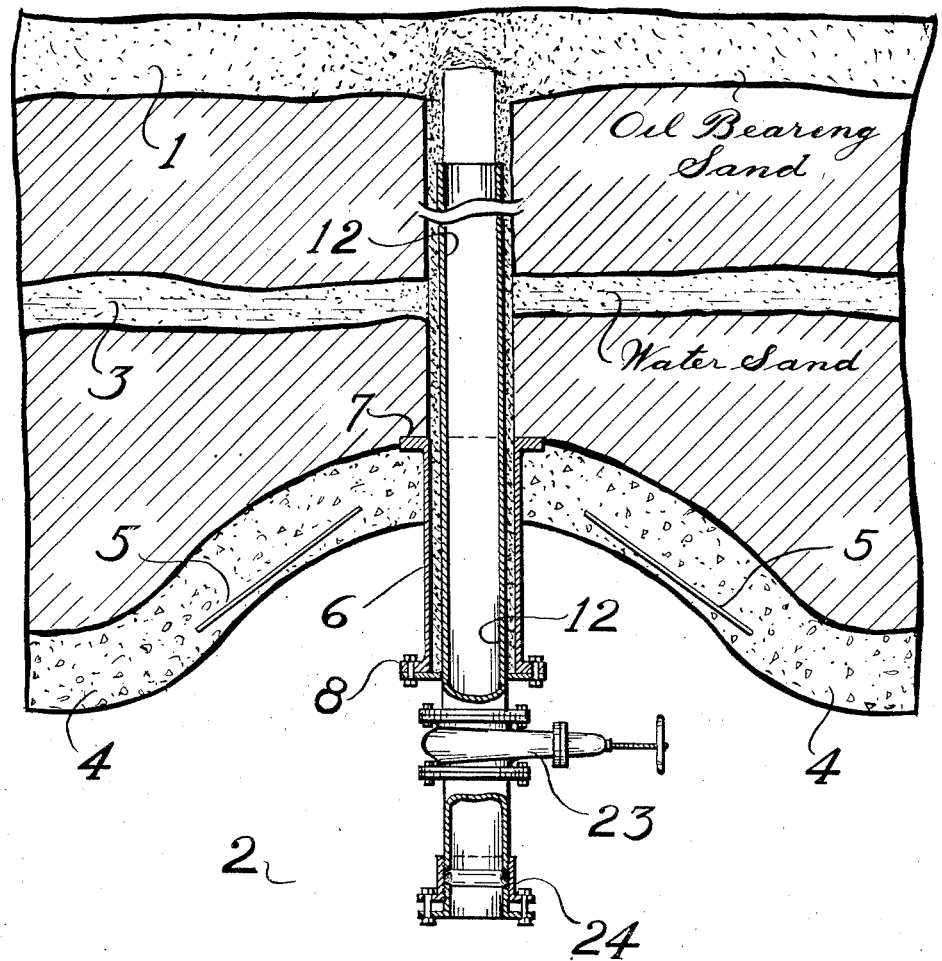
Fig. 2 is a longitudinal sectional view showing a conduit sealed into the earth strata.

In utilizing the equipment for tapping the oil-bearing sand from the gallery, the sealing clamp 9 and gate valve 10 are affixed in position on pipe 6 as illustrated in Fig. 1. A drill point is inserted into the assembly 6—9—10 through the gate valve 10 and the stuffing box 11 is affixed in position around the drill. The drill is now actuated through the stuffing box to form a hole extending through and beyond the offending stratum 3. The drill is then withdrawn from the pipe 6. Conduit 12 is inserted through the stuffing box 11 and gate valve 10 into the hole to a position extending into and beyond the offending stratum 3. The space between the pipe 6 and the conduit 12 beyond the gate valve 10, is sealed by turning the nut 21, see Fig. 3, thereby drawing the spring 18 tightly around the gasket 17 compressing the gasket. Sealing material such as grout or the like, is then inserted from the gallery through the conduit 8' under pressure greater than the rock pressure. The grout flows into the space between the conduit 12 and the pipe 6 and flows upwardly into the space beyond the seal between the conduit 12 and the walls of the hole. The grout backs up onto any coarse gravel layer or any fissure in the rock and seals it. The valve on 8' is closed and the gauge 8" is removed. The plastic material is permitted to harden. Subsequently, the sealing clamp 9, gate valve 10, and stuffing box 11 are removed from the pipe 6. A drill or the like is now inserted into the conduit 12 to drive the plug 13 from the conduit. A gate valve 23 and stuffing box 24 are then secured to the conduit 12 within the gallery as illustrated in Fig. 2. The hole is then extended to within a few inches of, or even into, the oil-bearing stratum depending upon conditions.

By the procedure described, an oil or gas bearing earth stratum can be tapped from a gallery without substantial escape into the gallery of oil, gas, water or sand throughout the operation. The method and apparatus described prevents escape of fluids or sand into the gallery under high pressures which may for example, amount to several hundred pounds per square inch. It will be understood that the sealing clamp will be formed sufficiently strong to maintain a seal under all operating pressures. A pipe gripper, bolts, spider or spear in sections can be used in conjunction with the sealing clamp to secure the screen pipe in position in the conduit. It is contemplated to use the invention to tap an oil or gas-bearing stratum from a gallery disposed above the stratum.

While a preferred embodiment of the invention has been shown and described, it will be understood that various modifications can be made within the spirit and scope of the invention and such modifications are intended to be included in the appended claims.

I claim:

1. In recovering oil from an oil-bearing earth stratum to which access is gained through an offending stratum, the steps which comprise securing a pipe into the earth, forming a hole from the pipe through the offending stratum while preventing substantial unconfined escape of material through the pipe, passing a closed conduit into and beyond the offending stratum, sealing the space between the conduit and pipe, and inserting plastic composition to close the space around the conduit beyond the seal.

2. In recovering oil from an oil-bearing earth stratum to which access is gained through an offending stratum, the steps which comprise securing a pipe into the earth, forming a hole from the pipe through the offending stratum while preventing substantial unconfined escape of material through the pipe, passing a conduit having a closed forward end into and beyond the offending stratum, sealing the space between the conduit and pipe, and inserting plastic composition under pressure around the conduit to seal the space around the conduit.

3. In recovering oil from oil-bearing earth stratum to which access is gained through an offending stratum under pressure, the steps which comprise securing a pipe into the earth, forming a hole from the pipe through the offending stratum while preventing substantial unconfined escape of material through the hole, passing a conduit having a closed forward end into and beyond the offending stratum, sealing the space between the conduit and pipe, and inserting plastic composition around the conduit under pressure greater than the pressure of the offending stratum.

4. In recovering oil from an oil-bearing earth stratum to which access is gained through a porous of fissure stratum, the steps which comprise securing a pipe into the earth, forming a hole from the pipe through the offending stratum while preventing substantial unconfined escape of material through the pipe, passing a conduit having a closed forward end into and beyond the offending stratum, sealing the space between the conduit and pipe, and inserting plastic composition around the conduit and into the porous or fissured stratum.

5. In recovering oil from an oil-bearing earth stratum to which access is gained through an offending stratum, the steps which comprise securing a pipe into the earth, forming a hole from the pipe through the offending stratum while preventing substantial unconfined escape of material through the pipe, passing a conduit having a closed forward end into and through the offending stratum, sealing the space between the conduit and pipe, inserting plastic composition to close the space around the conduit beyond the seal, and creating a passage through the closed end.

6. The method of recovering oil from an oil-bearing earth stratum to which access is gained through an offending stratum, comprising securing a pipe in the earth, forming a hole from the pipe through the offending stratum while preventing substantial unconfined escape of material through the pipe, passing a conduit having a closed forward end into and through the offending stratum, sealing the space between the conduit and pipe, inserting plastic composition to close the space around the conduit beyond the seal, creating a passage through the closed end, and extending the hole into the stratum.

7. The method of recovering oil from an oil-bearing stratum to which access is gained through an offending stratum, comprising securing a pipe in the earth, forming a hole from the pipe through the offending stratum while preventing substantial unconfined escape of material through the pipe, passing a conduit having a closed forward end into and through the offending stratum, sealing the space between the conduit and pipe, inserting plastic composition to close the space around the conduit beyond the seal, creating a passage through the closed end, and extending the hole into the stratum while preventing substantial unconfined escape of material from the hole.

LEO RANNEY.